United States Patent [19]

O'Neill

[11] Patent Number: 5,732,274

[45] Date of Patent: Mar. 24, 1998

[54] METHOD FOR COMPILATION USING A DATABASE FOR TARGET LANGUAGE INDEPENDENCE

[75] Inventor: Maureen K. O'Neill, Boulder, Colo.

[73] Assignee: Electronic Data Systems Corporation, Plano, Tex.

[21] Appl. No.: 555,358

[22] Filed: Nov. 8, 1995

[51] Int. Cl.⁶ ........................................................... G06F 9/44
[52] U.S. Cl. ........................................ 395/705; 395/604
[58] Field of Search ...................................... 395/705, 707, 395/603, 604, 605, 701

[56] References Cited

U.S. PATENT DOCUMENTS

| | | | |
|---|---|---|---|
| 4,330,822 | 5/1982 | Dodson | 395/710 |
| 5,084,813 | 1/1992 | Ono | 395/705 |
| 5,450,545 | 9/1995 | Martin et al. | 395/705 |
| 5,481,711 | 1/1996 | Sotani | 395/705 |
| 5,504,885 | 4/1996 | Alashgur | 395/705 |
| 5,586,330 | 12/1996 | Knudsen et al. | 395/705 |
| 5,640,550 | 6/1997 | Coker | 395/705 |

*Primary Examiner*—Kevin A. Kriess
*Attorney, Agent, or Firm*—L. Joy Griebenow

[57] ABSTRACT

A data access system wherein users specify questions to be asked of a data source independent of the actual storage mechanism for the data source. Queries are stored in the relational structures of a meta dictionary using a common query definition. From the common query definition, the system parses the user question, selects a target language determined by the actual storage mechanism of the data, and generates the language syntax for the target language to obtain the answer to the query. The target language may be any well-defined syntax used for accessing data. Because of the language independence, the source of the data may be a relational database, flat file or other data structure that has an access language.

12 Claims, 7 Drawing Sheets

| FUNCTION TAG | DISPLAY NAME | RETURN TYPE | NUM ARGS | TYPE NAME | FIX TYPE | PRECE-DENCE |
|---|---|---|---|---|---|---|
| ADD | ADD | NUMBER | 2 | MATH | INFIX | 6 |
| BEGINS | BEGINS WITH | BOOLEAN | 2 | COMP-STRING | PREFIX | 4 |
| BETWEEN | BETWEEN | BOOLEAN | 2 | COMP-NUMERAL | INFIX | 4 |
| CURRENT DATE | TODAY | DATE | 0 | DATE | PREFIX | 9 |
| LENGTH | LENGTH | INTEGER | 1 | STRING | PREFIX | 9 |

*FIG. 4*

| FUNCTION TAG | OPERAND | OPERAND TYPE | ARG NAME | OPERAND COUNT | OPTIONAL |
|---|---|---|---|---|---|
| ADD | 0 | NUMBER | FIRST ITEM | 1 | N |
| ADD | 1 | NUMBER | SECOND ITEM | 1 | N |
| BEGINS | 0 | STRING | STRING | 1 | N |
| BEGINS | 1 | STRING | PREFIX | 1 | N |
| LENGTH | 0 | STRING | STRING | 1 | N |
| BETWEEN | 0 | ANY | ITEM | 1 | N |
| BETWEEN | 1 | ANY | RANGE | 2 | N |

| FUNCTION TAG | TARGET LANGUAGE | SYNTAX MASK |
|---|---|---|
| ADD | DISPLAY | _+_ |
| ADD | ORACLE7 | $0 + $1 |
| BEGINS | DISPLAY | _BEGINS WITH_ |
| BEGINS | ORACLE7 | INSTR($0, $1)=1 |
| BETWEEN | DISPLAY | _BETWEEN_AND_ |
| BETWEEN | ORACLE7 | $0 BETWEEN $ AND #1 |
| CURRENT DATE | DISPLAY | TODAY |
| CURRENT DATE | ORACLE7 | SYSDATE |
| LENGTH | ORACLE7 | LENGTH($0) |

FIG. 7

METHOD FOR COMPILATION USING A DATABASE FOR TARGET LANGUAGE INDEPENDENCE

FIELD OF THE INVENTION

This invention relates to computer systems and more particularly to programming language compilers within such computer systems. Even more particularly, the invention relates to using a database to achieve compilation to multiple target languages within a compiler.

BACKGROUND OF THE INVENTION

Many available database and file query tools force the user to understand the syntax of the underlying access language for the database or file, for example Structured Query Language or SQL. This often requires users to learn a new syntax for each type of storage mechanism that contains their business data. Thus, users must also know where and how all their data is stored in order to know what language syntax to use. Also, it often requires that they learn multiple languages, whenever their data is stored in multiple file types or different databases.

The majority of the prior art tools generate variations of SQL including, but not limited to, ANSI SQL, ODBC, Oracle SQL, and Informix SQL. Example products include GQL, Forest & Trees, Business Objects, and Microsoft Access. Some other tools generate a proprietary language used to access a specific storage mechanism, for example the FastCount Language, Arbor Essbase and Pilot Lightship.

Existing query tools are not designed to be extended for additional access languages. Thus, they only solve a portion of the real business problem, and multiple tools, involving multiple languages are needed to solve the entire business problem.

Nor are existing query tools designed to allow their language to be extended. Most compilers embed the language into the source code of the compiler by programming the parsing and other processing of the language features. Thus, adding additional features to a language requires that the source code for the compiler be changed. This is often impossible because vendors seldom provide the source code for their products.

It is thus apparent that there is a need in the art for an improved method or apparatus which allows the user to ask a question about data using a common query definition, regardless of where the data is stored or what type of file contains the data. There is another need in the art for a query language that can be expanded without having to modify the compiler source code. The present invention meets these and other needs in the art.

SUMMARY OF THE INVENTION

It is an aspect of the present invention to provide a common query language for accessing data.

It is another aspect of the invention to provide such a common language wherein the language elements are stored in a data file to allow easy parsing and expansion of the language.

A further aspect of the invention is to provide translation of the common query language to one of a plurality of target languages, wherein a target language is suitable to access the desired data.

A still further aspect of the invention is to store the target languages within data file structures, thus providing for storage of data access syntax for multiple target languages.

Yet another aspect of the invention is the generation from the relational structures into the syntax of the target data access language.

The above and other aspects of the invention are accomplished in a system wherein users can specify questions to be asked of a data source in a manner that is independent of the actual storage mechanism for the data source. For example, users are able to ask "How many customers live in Colorado". The user first selects a target language, typically by selecting a data file containing the desired data and which can be accessed by the target language. The user then enters the query which is parsed using the common query language definition stored in a meta dictionary. The system produces a series of tokens representing the query, and the system then translates the tokens to generate language statement(s) for the target language. The system then sends the target language statement(s) to the target database management system to obtain the answer to the query.

The generated language syntax may be one of the many forms of SQL, or another well-defined syntax used for accessing data. Because of the language independence, the same query may be used to select data from a relational database, flat file or other data structure that has an access language. Thus the present invention allows the user to concentrate on the business question being formed without the burden of understanding the full syntax of the access language.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

The present invention presents a common language for asking questions of a data structure, independent of the storage mechanism used for the data structure. Therefore, the question can be asked of a flat file and a relational database in the same manner, and typically with the exact same query. The supported access languages are defined within meta dictionary structures of the invention along with the common query language definition. To add support for a new target language, the syntax for the new language is simply entered into the meta dictionary. Then, the appropriate language is generated based on the storage mechanism of the data source.

The present invention comprises four main areas:

A definition of a common query language

A user of the present invention may define a query in a language that is independent of the actual access syntax necessary to access the actual data. For example, if a user wanted to obtain a portion of a string, he/she could do so by simply specifying the position to begin copying from and the desired length of the string. The user does not need to be concerned that the syntax used to obtain the desired result varies greatly by target language.

For example, in the common definition language of the present invention, the syntax for obtaining a portion of a string is:

substring(string, starting position, desired length) This syntax may be the same or different in other query languages, for example in Oracle SQL, the syntax is:

substr(string, starting position, desired length) but in a language called Fast-Count, the syntax is string substring starting position to ending position Note, ending position is not asked of the user in the common definition language. However, it can be derived based on the other parameters. Therefore, the user asks the question in the same manner and the system performs the following calculation behind the scenes.

string substring starting position to (starting position+ desired length)

The common definition language is based on allowing the user to specify what he/she wants to accomplish in a user-friendly manner, regardless of the particular quirks of a specific language.

Relational structures for storing the common query language definition

A component subject area of the meta dictionary contains parsed information about the attributes and summarized data to retrieve from a data source for a particular query. Any calculated fields and complex conditions are defined simply by name and stored as generic expressions in the function and function arguments definition area.

The function syntax area of the meta dictionary contains information about how to generate calculated fields and complex conditions into the appropriate syntax of each target language for execution. Expressions are the basic building blocks of any language, be that C, SQL or Fast-Count Language. Therefore, the main relational table in this subject area is the function table and a table of secondary importance is the function arguments table.

Function table

Basic components of both unary and binary expressions. In a unary expression, the right operand columns are blank. In an Nary expression (greater than two arguments) the right operand contains a primary key into the function argument table for joins to obtain additional arguments. Recursive processing allows for nesting expressions and obtaining an order for evaluating expressions.

Relational structures for storing multiple target languages data access syntax

The supported access languages are defined within the meta dictionary structures along with the queries. To add support for a new access language, the syntax for each function of the new language is simply defined within the meta dictionary and mapped to the common query definition language. The common query language is stored in the same table structures as the specific access languages.

The main tables used for storing the access language are Function, Function Argument and Function Syntax:

Function

Defines the purpose of the function and main characteristics such as number of arguments and data type returned.

Function Argument

Rules for checking the validity of a particular argument. For example, the left operand of the substring function must be of type string.

Function Syntax

Syntax mask for the currently supported languages. Maps the Function and FunctionArguments from the common query definition into the appropriate syntax structure.

The generation from the relational structures into the syntax for the various data access languages For each supported access language, the system generates a shell specific to the access language of choice. For example, a basic shell for SQL is

SELECT
FROM
WHERE
    ORDER BY
    GROUP BY

After this shell is generated, the syntax generation is driven by the meta dictionary tables storing Function syntax masks. The defined expression and operands are obtained from the meta dictionary based on the user's request. The expression is then mapped into the appropriate syntax mask based on the Function syntax and Function argument tables. Therefore, the same expression generation program is used for each access language. The syntax is placed in the appropriate syntax shell and the completed query syntax is ready to be submitted to the corresponding data source for processing.

Figure 1:
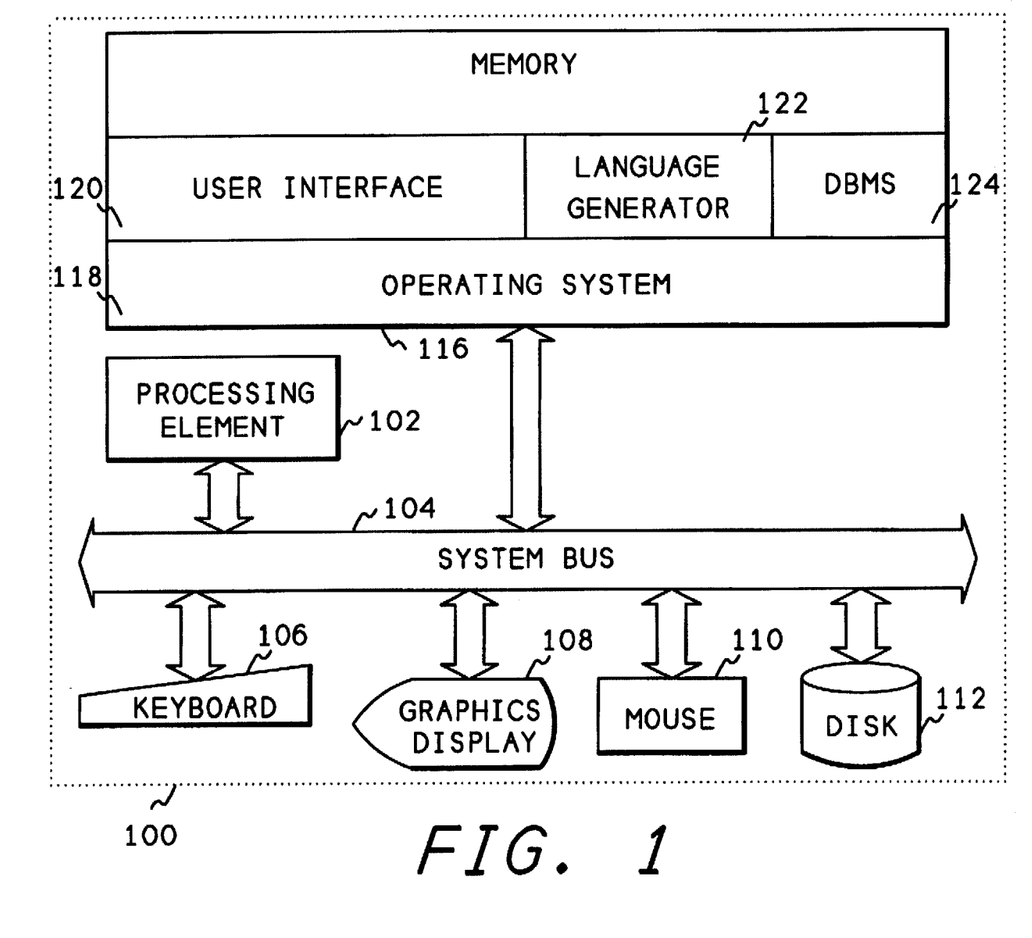
FIG. 1 shows a block diagram of a computer system incorporating the present invention.

FIG. 1 shows a block diagram of a computer system incorporating the present invention. Referring now to FIG. 1, a computer system 100 contains a processing element 102 which communicates to other elements of the computer system 100 over a system bus 104. A keyboard 106 and a mouse 110 allow a user to input data to the computer system 100 while a graphics display 108 allows software within the computer system to output information to the user. A disk 112 stores the software and data of the present invention.

A memory 116 contains an operating system 118, which may be any one of a plurality of operating systems, for example, the Microsoft Windows operating system, the Unix operating system, etc. A user interface 120 gets information from the user to pass to the language generator 122 which creates language statements suitable for passing to a database management system 124. The database management system 124, which is typically a commercially available database management system, accesses a database on the disk 112 to produce the results desired by the user.

Figure 2:
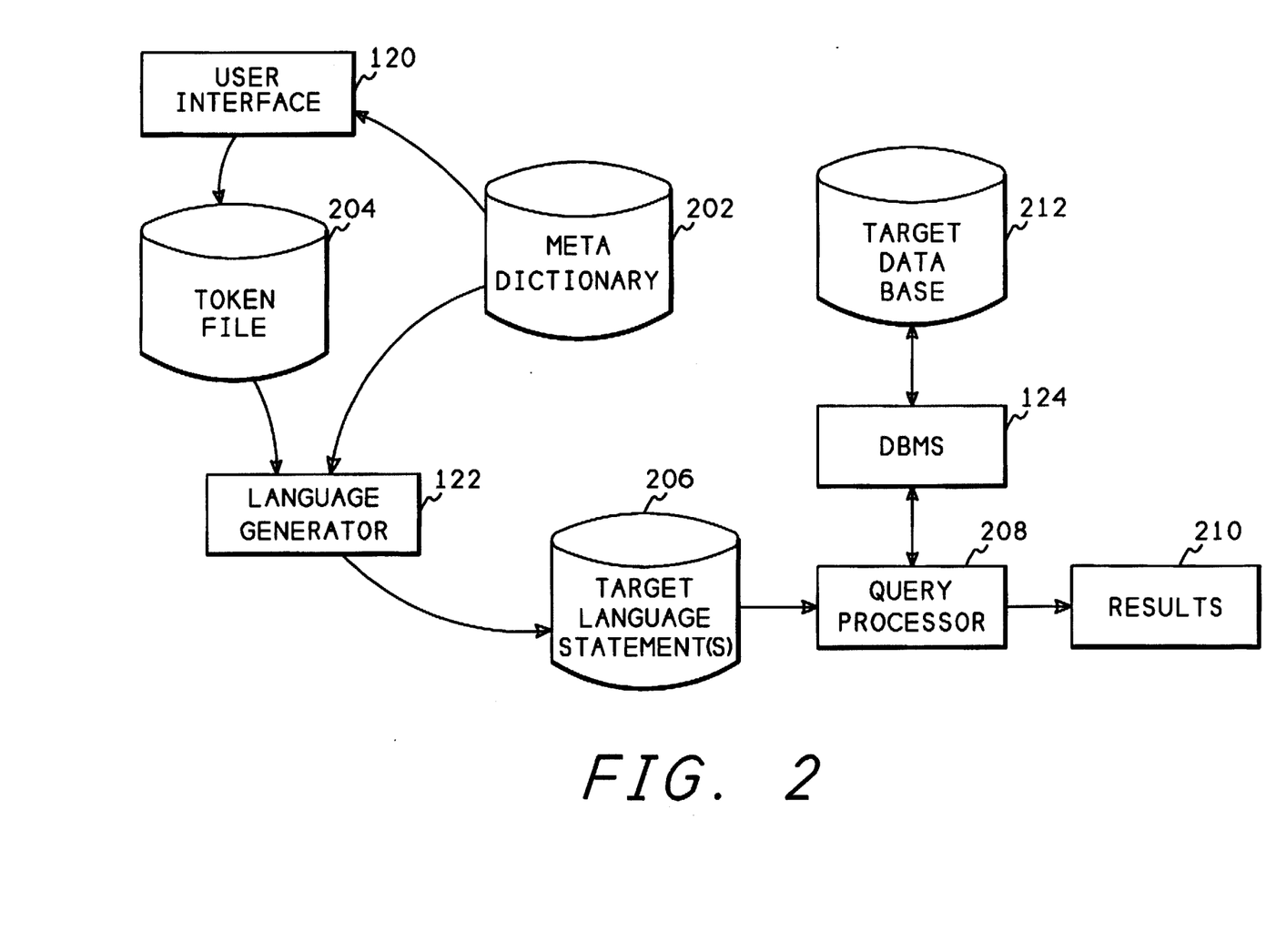
FIG. 2 shows a data flow diagram of the invention.

FIG. 2 shows data flow within the present invention. Referring now to FIG. 2, a user interface 120 (also shown in FIG. 1) accesses a meta dictionary 202 to display information about the common query language to a user of the system. The user then enters a query, or selects from menu options in a windows operating system. The data input by the user is transformed into a token file 204, by using data from the meta dictionary 202. The token file 204 and meta dictionary information 202 are then input to a language generator 122 which uses the meta dictionary information and the information from the token file to create language statements in a language suitable for accessing a database. The database is typically a commercially available database, and the language is typically a language defined specifically for that commercially available database. As described below, the language generator 122, using data from the meta dictionary 202, can generate statements for any one of a plurality of languages.

The language generator 122 creates one or more target language statements 206 which are then passed to a query processor 208. The query processor 208 passes the target language statements 206 to a database management system 124 which accesses the target database 212. Data returned from the DBMS 124 to the query processor is the results 210, which are then displayed to the user.

Figure 3:
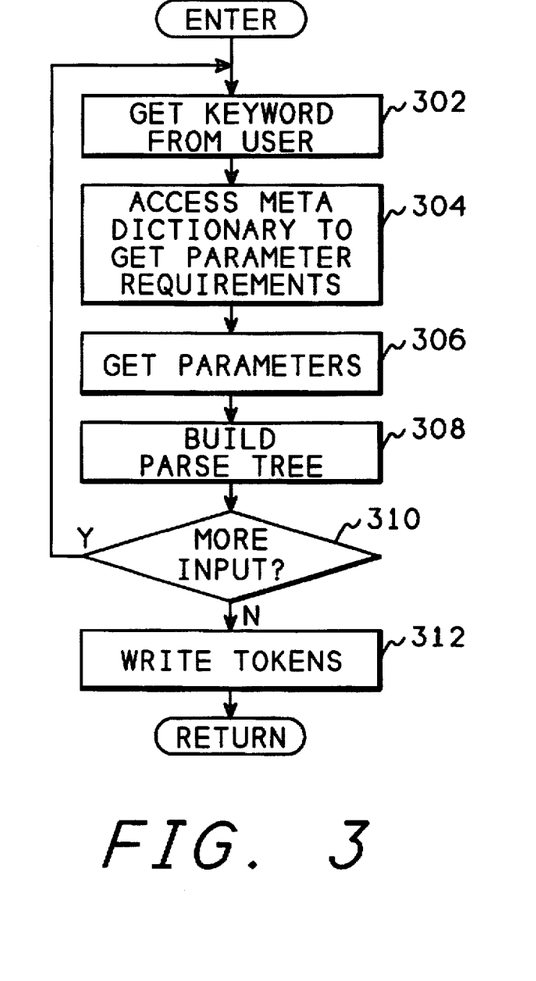
FIG. 3 shows a flowchart of the user interface portion of the invention.

FIG. 3 shows a flowchart of the user interface 120 of FIG. 2 and FIG. 1. Referring now to FIG. 3, after entry, block 302 gets a keyword from the user and block 304 accesses the meta dictionary to get the required parameters associated with the keyword. For example, if the keyword is the word "add", the meta dictionary indicates that an add function requires two parameters (see FIG. 4, below), thus block 304 would obtain the data indicating that two parameters are required and pass this information to block 306 which would obtain the two parameters from the user. Using the original keyword and the parameters, block 308 builds a parse tree and block 310 determines whether there is additional input from the user. If there is additional input, block 310 transfers back to block 302 to get the next keyword and parameters in the sequence. After all input has been received, block 310 transfers to block 312 which writes the token file 204 (FIG. 2).

Those skilled in the art will recognize that using a windows type operating system, information from the meta dictionary, such as the functions available within the common query language, could be presented to the user and the user could simply choose from among the presented information rather than typing keywords directly into the system.

Figure 4:
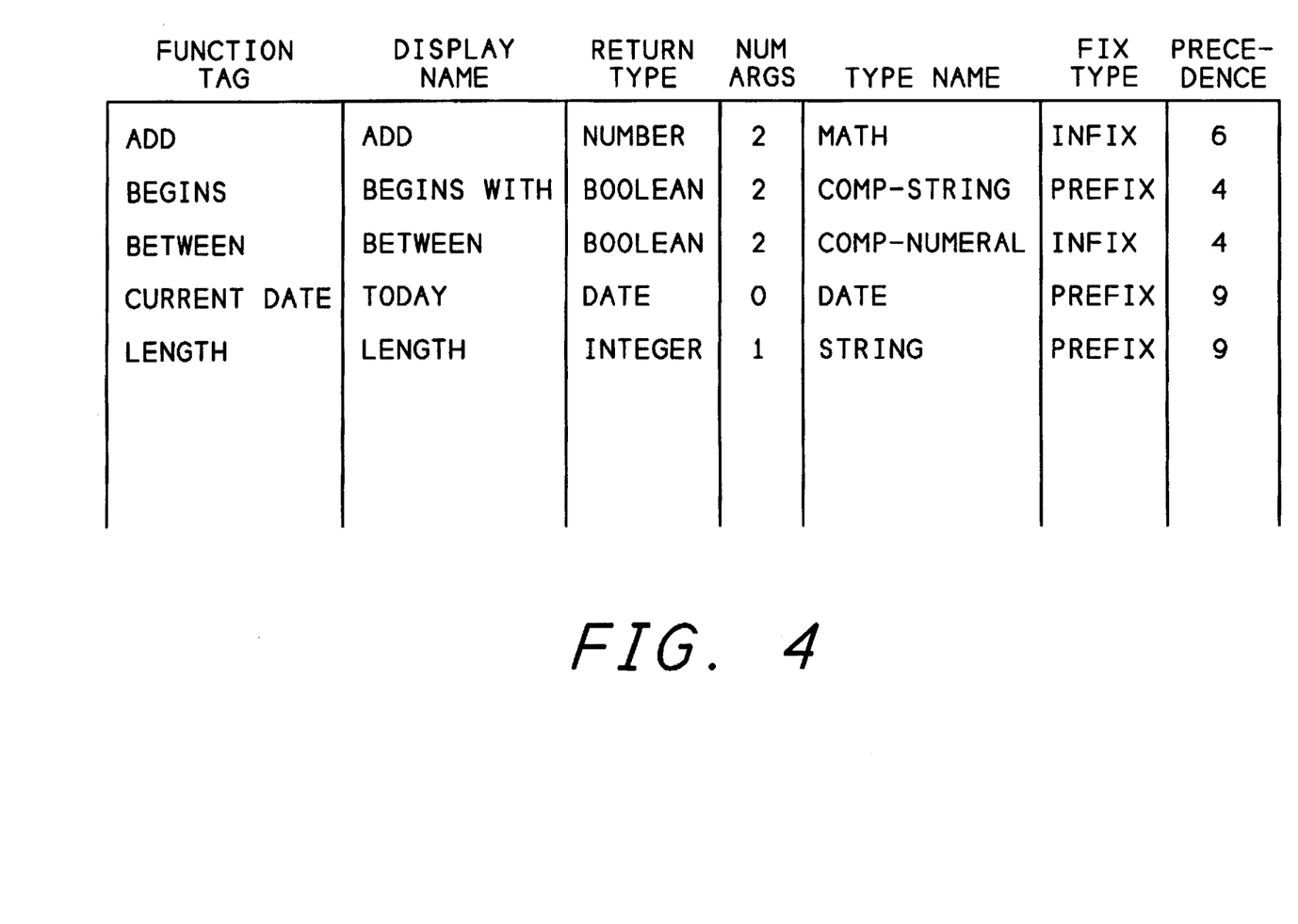
FIG. 4 shows a layout of the meta dictionary for functions of the common query language.

FIG. 4 shows a layout of the meta dictionary table for functions of the common query language. Referring now to FIG. 4, a FUNCTION TAG column contains a name for each of the functions within the common query language, and a DISPLAY NAME column contains the name of the function as it should be displayed to the user. A RETURN TYPE column indicates the type of data returned by the function after it performs an operation and a NUM ARGS column identifies the number of arguments required by the function in order to perform the operation. A TYPE NAME column identifies the type of the function and a FIX TYPE column identifies whether the function is an infix type function, that is, with parameters on either side such as 2+3, or whether the function is a prefix or a postfix function. A PRECEDENCE column indicates the precedence of the function relative to other functions within the compilation process.

Figure 5:
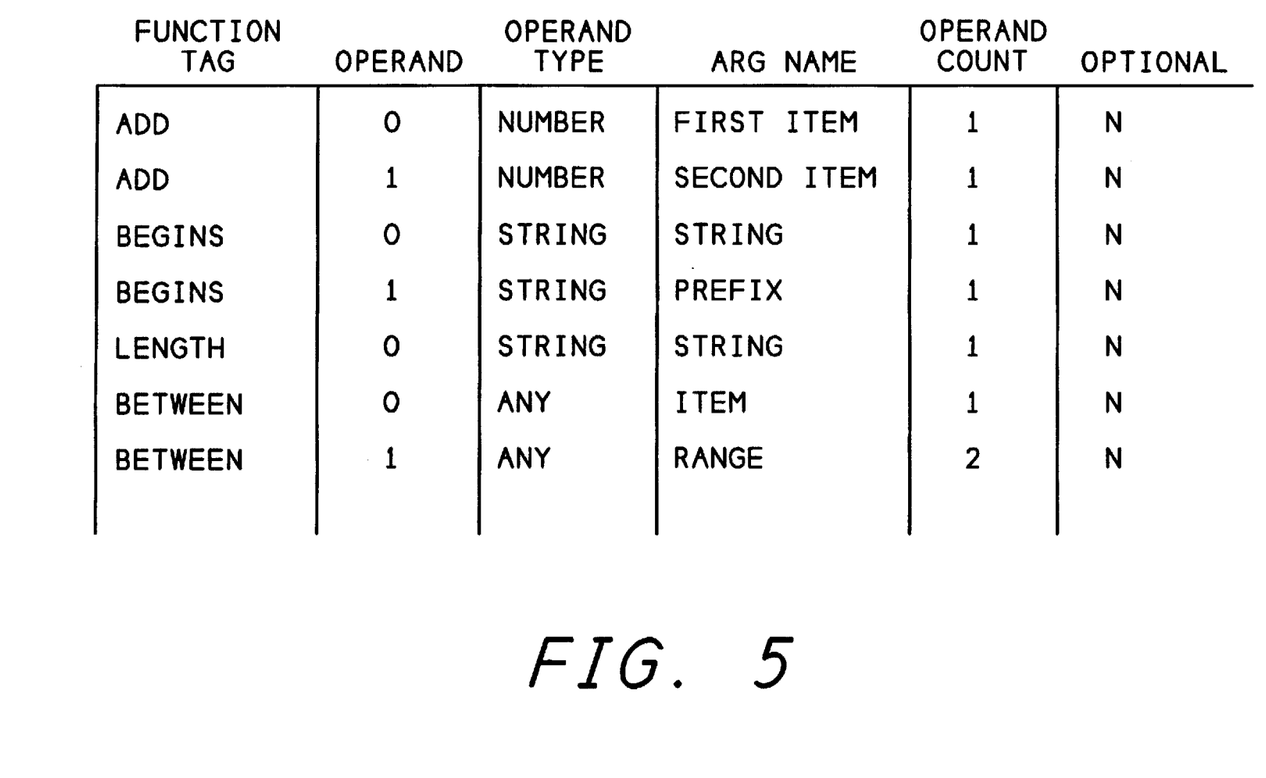
FIG. 5 shows a layout of the meta dictionary for function arguments of the common query language.

FIG. 5 shows a layout of the meta dictionary area for function arguments within the common query language. Referring now to FIG. 5, a FUNCTION TAG column contains the name of the function as it appeared in the FUNCTION TAG column of FIG. 4, thus joining the two tables. An OPERAND column identifies which operand of the function corresponds to this row of the table. An OPERAND TYPE column identifies the type of the operand, and an ARG NAME column identifies which operand is being referenced in this row of the table. An OPERAND COUNT column defines a number of sub-operands required for this operand. For example, for the second operand of the BETWEEN function, two sub-operands are required, this specifying two parameters, between which the selection should occur. The OPTIONAL column identifies whether the parameter is an optional parameter for the function.

As an example, consider the "BEGINS" function in both FIG. 4 and FIG. 5. In FIG. 4, the BEGINS function has a display name of BEGINS WITH, which indicates that the function is used to specify the starting characters of a string. The RETURN TYPE of the function is BOOLEAN since the function will return a yes/no answer after it compares the parameter to the string. The BEGINS function takes two arguments and it is a compare string type of operation. FIG. 5 shows that the first parameter for BEGINS is a string and that the second parameter is also a string.

Figure 6:
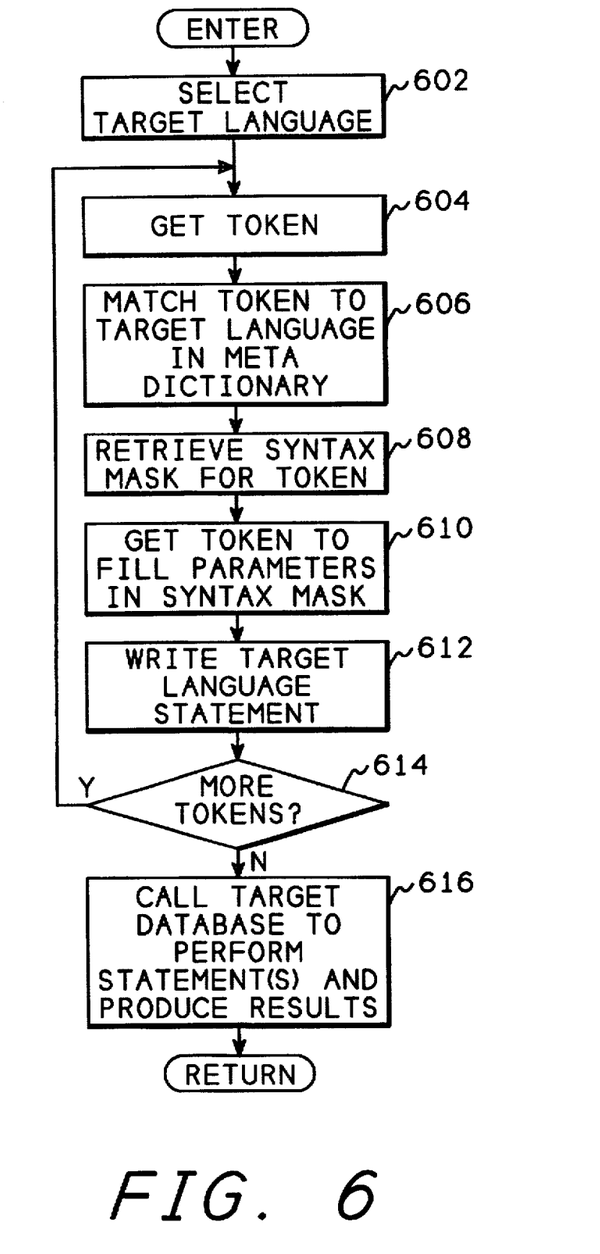
FIG. 6 shows a flowchart of the language generator of the present invention.

FIG. 6 shows a flowchart of the language generator 122 (FIG. 2) of the present invention. Referring now to FIG. 6, after entry, block 602 selects the target language. Selection of the target language is typically done by the user when the user selects the particular file to access, since each file will have a particular target language based on the particular database management system that processes the file. Thus, block 602 merely has to recall the selection.

Block 604 then gets a token from the token file 204 (FIG. 2) and block 606 matches the token to the target language in the meta dictionary. As will be shown below with respect to FIG. 7, each function of the common query language is represented in each target language, therefore, block 606 must match the token name (function name) as well as the language selected in block 602. Block 608 then retrieves a syntax mask for the token (see FIG. 7 below), and block 610 then gets additional tokens to fill the parameters in the syntax mask. Block 612 then writes the target language statement and block 614 determines whether there are more tokens to be processed and if so, transfers back to block 604 to get the next token.

After all tokens have been processed, block 616 performs the query process 208 (FIG. 2) function by calling the target database to perform the language statements just built and produce the results desired by the user.

Figure 7:
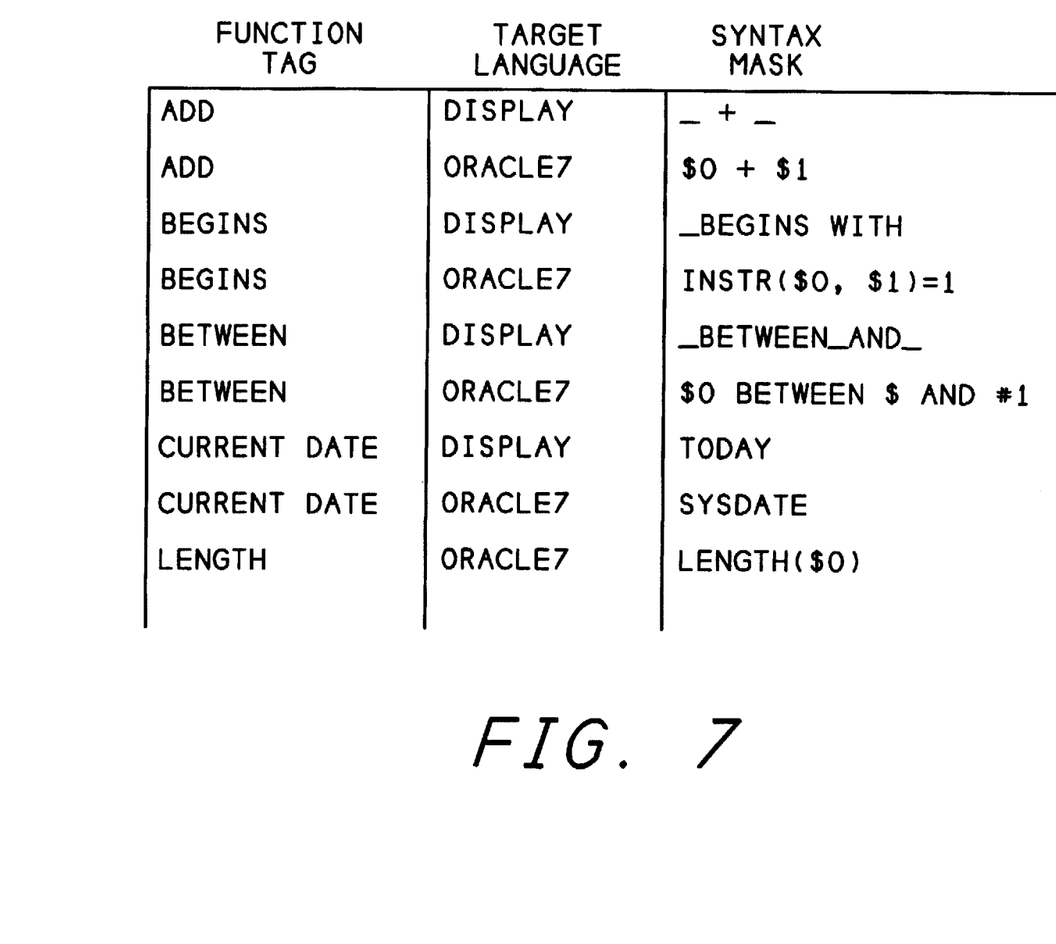
FIG. 7 shows a layout of the meta dictionary for the plurality of target languages of the invention.

FIG. 7 shows a layout of the meta dictionary section for the plurality of target languages that can be generated by the present invention. Referring now to FIG. 7, a FUNCTION TAG column identifies the name of the function and corresponds to the FUNCTION TAG columns in FIGS. 4 and 5. A SYNTAX MASK column defines the syntax template for the particular target language, and a TARGET LANGUAGE column identifies the target language to which the syntax mask corresponds.

For example, the BEGINS function described above required two parameters, and FIG. 7 shows that for the ORACLE7 language, the BEGINS function is translated to a function called "INSTR", wherein the first parameter of the BEGINS function replaces the "$0" within the syntax mask for the INSTR function and the second parameter replaces the string "$1". Thus, if a user were to select the BEGINS WITH operation, shown in the display name column of FIG. 4, this would indicate that the BEGINS function is to be called and FIG. 4 shows that this requires two arguments. FIG. 5 shows that the first of these parameters is a string and the second of these parameters is a string. Thus, the user might enter a database field, for example "state", for the first parameter and a character, for example "C", for the second parameter, thus selecting states that begin with the character "C". This would then get translated, if the target database is an ORACLE7 database, into the command "INSTR(STATE, 'C')=1".

Tables 1–4 show the data contained in the various files for an example of the present invention. Referring now to Tables 1–4. Table 1 shows a query that a user might make of a customer database. Table 1 shows that the user wishes to select four different database fields—age, ethnicity, gender, and income—and display or print these fields for all customers whose state begins with the letter C and whose zip code is between 80001 and 90001 or who live in a city named Boulder. As described above, the information in Table 1 could have been entered directly by a user, or the data could result from selections made by a user of various displays within a windowed operating system.

Table 4 shows the resulting target language statements 206 (FIG. 2) that will be used to access the database to produce the results required of the user entering the selection of Table 1.

Table 2 shows a portion of the token file 204 (FIG. 2) that contains the four database fields selected by the user. Table 2 shows the same field names that appear in the select statement of Table 1, along with the field numbers assigned to those fields within the particular target database.

Table 3 shows the tokens that will be passed through the token file 204 for the selection criteria of the statement of Table 1. Referring now to Table 3, the token string starts with two left parentheses and then a BEGINS function, as described above in FIGS. 4, 5, and 7. As described above, the BEGINS function requires two parameters, therefore, token 4 is an open parenthesis, which starts the parameter list. Token field 5 identifies the first parameter as a database field number 233. From the query statement of Table 1, it can be seen that this particular database field is the state field. Token 6 is a comma separating the two parameters, and token 7 is a string containing the value C, thus indicating that the user wants to select states that begin with the letter C. Token 8 is a right parenthesis to close the BEGINS function parameter list, and token 9 is the AND function to indicate that the selection of states beginning with C is in addition to further selection criteria. Token 10 shows that the additional criteria is the selection of a database field, which from the query of Table 1 we know is the zip field, and then token 11 indicates that the selection within the zip field will be done by a function called BETWEEN which, from FIGS. 4 and 5, requires two arguments. These arguments are present in the next three tokens, wherein token 12 is the first value for the database field, token 13 is a comma to separate the two values and token 14 is the second value for the between function, thus corresponding to the selection shown in Table 1. Tokens 15 and 16 close the first selection and token 17 starts the next selection, which begins by specifying a database field 231, which from the selection of Table 1, is the city database field. Token 19 indicates that the city field will be compared to a second parameter which is the string "BOULDER" in token 20, and selection occurs when they are equal.

Table 4 shows the complete selection statement built from the input of Table 1 as described above.

Having thus described a presently preferred embodiment of the present invention, it will be understood by those skilled in the art that many changes in construction and circuitry and widely differing embodiments and applications of the invention will suggest themselves without departing from the scope of the present invention as defined in the claims. The disclosures and the description herein are intended to be illustrative and are not in any sense limiting of the invention, defined in scope by the following claims.

TABLE 1

Select Age, Ethnicity, Gender, Income for customers whose state begins with C and Zip is between 80001 and 90001 or city is Boulder

TABLE 2

| Field Number | Field Name |
|---|---|
| 261 | Age |
| 263 | Ethnicity |
| 259 | Gender |
| 260 | Income Code |

TABLE 3

| Token Number | Type | Value |
|---|---|---|
| 1 | Function | Parenthesis Left |
| 2 | Function | Parenthesis Left |
| 3 | Function | begins |
| 4 | Function | Parenthesis Left |
| 5 | db Field | 233 |
| 6 | Function | Comma |
| 7 | String | C |
| 8 | Function | Parenthesis Right |
| 9 | Function | And |
| 10 | db Field | 235 |
| 11 | Function | between |
| 12 | Double | 80001.000000 |
| 13 | Function | comma |
| 14 | Double | 90001.000000 |
| 15 | Function | Parenthesis Right |
| 16 | Function | Parenthesis Right |
| 17 | Function | Or |
| 18 | db Field | 231 |
| 19 | Function | Equal |
| 20 | String | Boulder |

TABLE 4 selSet = sql (db__cursor, "Select CUSTOMER.AGE, CUSTOMER.ETHNICITY, CUSTOMER.SEX__CD, CUSTOMER.INCOME__CD from testing2.ADDRESS, testing2.CUSTOMER where (CUSTOMER.ADDRESS__ID = ADDRESS.ADDRESS__ID) and (instr(ADDRESS.STATE, 'C') = 1 and ADDRESS.ZIP between 80001.000000 and 90001.000000) or ADDRESS.CITY – 'Boulder'")

What is claimed is:

1. A method for translating a first programming language into a selected one of a plurality of target programming languages, the method comprising the steps of:
    (a) storing a table of target language functions in a database, wherein the table comprises a plurality of functions for each target programming language, one function for each target programming language corresponding to each first language function;
    (b) selecting one of the target programming languages;
    (c) receiving a first language function from a user of the method;
    (d) prompting the user for a number of parameters needed for the first language function received in step (c);
    (e) accessing the table of target language functions and retrieving a function corresponding to the function received in step (c) and further corresponding to the target programming language selected in step (b); and
    (f) translating the function received in step (c) and the parameters received in step (d) into the target programming language function retrieved in step (e).

2. The method of claim 1 wherein step (a) further comprises the following step (a1), and step (c) further comprises the following step (c1):

(a1) storing in a database a table comprising first language functions available in the first programming language; and (c1) accessing the table of first language functions to retrieve a number of parameters needed for the first language function received in step (c).

3. The method of claim 1 wherein step (e) further comprises the following step (e1), and step (f) further comprises the following step (f1):

(e1) retrieving a syntax mask along with the target language function; and (f1) substituting the parameters received in step (d) into the syntax mask retrieved in step (e1).

4. The method of claim 1 wherein step (b) further comprises selecting the target programming language by selecting a file accessed by a file management program that accepts at least one of the target programming languages and then selecting one of the target programming languages that is acceptable by the file management program.

5. The method of claim 1 wherein step (a) further comprises the step of:

(a1) providing an additional target programming language by storing, in the database, a plurality of function definitions for the additional target programing language, one additional target programming language function definition corresponding to each function of the first programming language.

6. A method for translating a first programming language into a selected one of a plurality of target programming languages, the method comprising the steps of:

(a) storing in a database a table comprising first language functions available in the first programming language;

(b) storing a table of target language functions in the database, wherein the table comprises a plurality of functions for each target programming language, one function for each target programming language corresponding to each first language function;

(c) selecting one of the target programming languages;

(d) receiving a first language function from a user of the method;

(e) accessing the table of first language functions to retrieve a number of parameters needed for the first language function received in step (d);

(f) prompting the user for the number of parameters retrieved in step (e);

(g) accessing the table of target language functions and retrieving a function corresponding to the function received in step (d) and further corresponding to the target programming language selected in step (c); and (h) translating the function received in step (d) and the parameters received in step (f) into the target programming language function retrieved in step (g).

7. The method of claim 6 wherein step (g) further comprises the following step (g1), and step (h) further comprises the following step (h1):

(g1) retrieving a syntax mask along with the target language function; and (h1) substituting the parameters received in step (f) into the syntax mask retrieved in step (g1).

8. The method of claim 6 wherein step (c) further comprises selecting the target programming language by selecting a file accessed by a file management program that accepts at least one of the target programming languages and then selecting one of the target programming languages that is acceptable by the file management program.

9. The method of claim 6 wherein step (b) further comprises the step of:

(b1) providing an additional target programming language by storing, in the database, a plurality of function definitions for the additional target programming language, one additional target programming language function definition corresponding to each function of the first programming language.

10. A method for translating a first programming language into a selected one of a plurality of target programming languages, the method comprising the steps of:

(a) storing in a database a table comprising first language functions available in the first programming language;

(b) storing a table of target language functions in the database, wherein the table comprises a plurality of functions for each target programming language, one function for each target programming language corresponding to each first language function;

(c) selecting one of the target programming languages;

(d) receiving a first language function from a user of the method;

(e) accessing the table of first language functions to retrieve a number of parameters needed for the first language function received in step (d);

(f) prompting the user for the number of parameters retrieved in step (e);

(g) accessing the table of target language functions and retrieving a syntax mask for a function corresponding to the function received in step (d) and further corresponding to the target programming language selected in step (c); and (h) translating the function received in step (d) and the parameters received in step (f) into the target programming language function retrieved in step (g) by substituting the parameters received in step (f) into the syntax mask retrieved in step (g1).

11. The method of claim 10 wherein step (c) further comprises selecting the target programming language by selecting a file accessed by a file management program that accepts at least one of the target programming languages and then selecting one of the target programming languages that is acceptable by the file management program.

12. The method of claim 10 wherein step (b) further comprises the step of:

(b1) providing an additional target programming language by storing, in the database, a plurality of function definitions for the additional target programing language, one additional target programming language function definition corresponding to each function of the first programming language.

* * * * *